US012006623B2

(12) United States Patent
Welch

(10) Patent No.: US 12,006,623 B2
(45) Date of Patent: Jun. 11, 2024

(54) MOTOR ASSEMBLY FOR A LAUNDRY TREATING APPLIANCE

(71) Applicant: WHIRLPOOL CORPORATION, Benton Harbor, MI (US)

(72) Inventor: Rodney M. Welch, Eau Claire, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 18/138,406

(22) Filed: Apr. 24, 2023

(65) Prior Publication Data

US 2023/0257925 A1 Aug. 17, 2023

Related U.S. Application Data

(63) Continuation of application No. 17/559,614, filed on Dec. 22, 2021, now Pat. No. 11,661,699, which is a
(Continued)

(51) Int. Cl.

| | |
|---|---|
| ***D06F 58/00*** | (2020.01) |
| ***D06F 39/08*** | (2006.01) |
| ***D06F 58/04*** | (2006.01) |
| ***D06F 58/20*** | (2006.01) |
| ***D06F 58/24*** | (2006.01) |
| ***F26B 3/14*** | (2006.01) |

(Continued)

(52) U.S. Cl.
CPC .............. *D06F 58/00* (2013.01); *D06F 58/04* (2013.01); *D06F 58/206* (2013.01); *F26B 5/042* (2013.01); *F26B 13/16* (2013.01); *F26B 25/16* (2013.01); *D06F 39/085* (2013.01); *D06F 58/20* (2013.01); *D06F 58/24* (2013.01); *F26B 3/14* (2013.01)

(58) Field of Classification Search
CPC ........ D06F 58/00; D06F 58/04; D06F 58/206; D06F 39/085; D06F 58/20; D06F 58/24; D06F 58/28; F26B 5/042; F26B 13/16; F26B 25/16; F26B 3/14; F26B 5/00
USPC ............................................... 34/92, 595–610
See application file for complete search history.

(56) References Cited

U.S. PATENT DOCUMENTS 2,656,697 A 10/1953 Rand
2,686,372 A 8/1954 Graham
(Continued)

FOREIGN PATENT DOCUMENTS

CN 203113114 U 8/2013
CN 103387270 A 11/2013
(Continued)

OTHER PUBLICATIONS

European Search Report for Counterpart EP19164087.9, dated May 6, 2019.
(Continued)

*Primary Examiner* — Stephen M Gravini
(74) *Attorney, Agent, or Firm* — McGarry Bair PC

(57) ABSTRACT

A motor assembly for a laundry treating appliance, the motor assembly including an impeller housing, a compressor housing disposed within the impeller housing, a compressor motor disposed within the compressor housing, an impeller mechanically coupled to the compressor motor and disposed within the impeller housing, and a cover for the impeller housing.

18 Claims, 10 Drawing Sheets

Related U.S. Application Data continuation of application No. 17/014,033, filed on Sep. 8, 2020, now Pat. No. 11,242,646, which is a continuation of application No. 16/288,665, filed on Feb. 28, 2019, now Pat. No. 10,816,266.

(60) Provisional application No. 62/724,917, filed on Aug. 30, 2018.

(51) Int. Cl.

| | |
|---|---|
| ***F26B 5/04*** | (2006.01) |
| ***F26B 13/16*** | (2006.01) |
| ***F26B 25/16*** | (2006.01) |

(56) References Cited

U.S. PATENT DOCUMENTS

| | | | | |
|---|---|---|---|---|
| 2,701,421 | A | 2/1955 | Erickson et al. | |
| 2,734,023 | A | 2/1956 | Hickman | |
| 2,777,313 | A | 1/1957 | Dodge | |
| 2,899,366 | A | 8/1959 | Hickman | |
| 3,110,544 | A | 11/1963 | Moulthrop | |
| 3,290,909 | A | 12/1966 | Schwing et al. | |
| 3,894,815 | A * | 7/1975 | Beeton | F04D 25/0606 417/372 |
| 3,956,072 | A | 5/1976 | Huse | |
| 4,041,614 | A | 8/1977 | Robinet | |
| 4,305,211 | A | 12/1981 | Peterson | |
| 4,603,489 | A | 8/1986 | Goldberg | |
| 4,621,438 | A | 11/1986 | Lanciaux | |
| 4,811,495 | A | 3/1989 | Huang et al. | |
| 5,131,169 | A | 7/1992 | Jaster | |
| 5,357,771 | A | 10/1994 | Schaal | |
| 5,430,956 | A | 7/1995 | Lange | |
| 5,459,945 | A | 10/1995 | Shulenberger | |
| 5,724,750 | A | 3/1998 | Burress | |
| 5,810,975 | A | 9/1998 | Bourdel | |
| 5,940,988 | A | 8/1999 | Eisen | |
| 5,980,695 | A | 11/1999 | Cox et al. | |
| 6,293,121 | B1 | 9/2001 | Labrador | |
| 6,370,798 | B1 | 4/2002 | Gonzalez, Sr. | |
| 7,275,400 | B2 * | 10/2007 | Severns | B01J 20/28033 68/18 F |
| 7,458,171 | B1 | 12/2008 | Lentz | |
| 7,526,879 | B2 | 5/2009 | Bae et al. | |
| 7,812,557 | B2 * | 10/2010 | Maekawa | D06F 37/304 388/906 |
| 8,245,545 | B2 * | 8/2012 | Maekawa | D06F 34/10 68/3 R |
| 8,572,865 | B2 | 11/2013 | Beers et al. | |
| 8,707,581 | B2 | 4/2014 | Quaroni et al. | |
| 9,255,732 | B2 | 2/2016 | Shu et al. | |
| 9,261,096 | B2 * | 2/2016 | Lin | F04D 1/06 |
| 9,487,908 | B1 | 11/2016 | Roch | |
| 9,605,897 | B2 | 3/2017 | Hyde et al. | |
| 9,677,215 | B2 * | 6/2017 | Kim | D06F 58/22 |
| 9,834,882 | B2 | 12/2017 | Patil | |
| 10,260,194 | B2 | 4/2019 | Green et al. | |
| 10,662,573 | B2 | 5/2020 | Xu et al. | |
| 10,816,266 | B2 | 10/2020 | Welch | |
| 11,242,646 | B2 | 2/2022 | Welch | |
| 11,390,975 | B2 | 7/2022 | Hahm et al. | |
| 11,661,699 | B2 * | 5/2023 | Welch | D06F 58/206 34/92 |
| 11,802,360 | B2 * | 10/2023 | Bocchino | D06F 58/22 |
| 2003/0132095 | A1 | 7/2003 | Kenet et al. | |
| 2004/0083773 | A1 | 5/2004 | North | |
| 2007/0151311 | A1 | 7/2007 | McAllister et al. | |
| 2010/0107703 | A1 * | 5/2010 | Hisano | D06F 58/206 68/20 |
| 2012/0090191 | A1 | 4/2012 | Colombo et al. | |
| 2014/0245630 | A1 | 9/2014 | McCarthy | |
| 2016/0160425 | A1 | 6/2016 | Bison et al. | |
| 2016/0289881 | A1 | 10/2016 | Song et al. | |
| 2018/0237980 | A1 | 8/2018 | Xu et al. | |
| 2019/0054407 | A1 | 2/2019 | Bailey | |
| 2019/0310017 | A1 | 10/2019 | Krebs | |
| 2020/0072549 | A1 | 3/2020 | Welch | |
| 2020/0400374 | A1 | 12/2020 | Welch | |
| 2021/0102333 | A1 | 4/2021 | Djerekarov et al. | |
| 2021/0176891 | A1 | 6/2021 | Lee et al. | |
| 2021/0230788 | A1 | 7/2021 | Lee et al. | |
| 2023/0175194 | A1 * | 6/2023 | Ryoo | D06F 34/22 34/318 |
| 2023/0257925 | A1 * | 8/2023 | Welch | F26B 13/16 34/92 |
| 2023/0287621 | A1 * | 9/2023 | Yoon | D06F 58/22 34/73 |

FOREIGN PATENT DOCUMENTS

| | | | | |
|---|---|---|---|---|
| CN | 103924427 | A | 7/2014 | |
| CN | 205529590 | U | 8/2016 | |
| CN | 106352669 | A | 1/2017 | |
| CN | 106868834 | A | 6/2017 | |
| DE | 3641665 | A1 | 6/1988 | |
| DE | 3644077 | A1 | 7/1988 | |
| DE | 102006041431 | A1 | 6/2007 | |
| DE | 112006003182 | T5 | 10/2008 | |
| EP | 0043361 | A1 | 1/1982 | |
| EP | 2609245 | B1 | 12/2016 | |
| EP | 3467402 | A1 * | 4/2019 | F04D 29/051 |
| EP | 3617394 | A1 | 3/2020 | |
| FR | 882282 | A | 5/1943 | |
| FR | 1501448 | A | 11/1967 | |
| GB | 2272753 | A | 5/1994 | |
| GB | 2366810 | A1 | 3/2002 | |
| JP | 1223997 | A | 9/1989 | |
| JP | 7178288 | A | 7/1995 | |
| KR | 200320970 | Y1 | 7/2003 | |
| KR | 20040090051 | A | 10/2004 | |
| WO | 2004074187 | A1 | 9/2004 | |
| WO | 2007061206 | A1 | 5/2007 | |
| WO | 2014110957 | A1 | 7/2014 | |
| WO | 2014205430 | A1 | 12/2014 | |
| WO | WO-2019130935 | A1 * | 7/2019 | |
| WO | WO-2020052011 | A1 * | 3/2020 | H02K 5/20 |

OTHER PUBLICATIONS

European Patent Office, European Search Report re Application No. 19164100.0-1018, dated Oct. 8, 2019, 6 pages, Munich, Germany.

* cited by examiner

MOTOR ASSEMBLY FOR A LAUNDRY TREATING APPLIANCE

CROSS REFERENCE TO RELATED APPLICATIONS

This application is a continuation of U.S. patent application Ser. No. 17/559,614, filed on Dec. 22, 2021, now U.S. Pat. No. 11,661,699, issued May 30, 2023, which is a continuation of U.S. patent application Ser. No. 17/014,033, filed on Sep. 8, 2020, now U.S. Pat. No. 11,242,646, issued Feb. 8, 2022, which is a continuation of U.S. patent application Ser. No. 16/288,665 filed Feb. 28, 2019, now U.S. Pat. No. 10,816,266, issued Oct. 27, 2020, which claims priority under 35 U.S.C. § 119(e) to U.S. Provisional Patent Application No. 62/724,917, filed Aug. 30, 2018, entitled "LOW PRESSURE LAUNDRY TREATING APPLIANCE," all of which are herein incorporated by reference in their entirety.

BACKGROUND

Laundry treating appliances, such as clothes washers, clothes dryers, refreshers, and non-aqueous systems, can have a configuration based on a rotating drum that defines a treating chamber having an access opening through which laundry items are placed in the treating chamber for treating. The laundry treating appliance can have a controller that implements a number of pre-programmed cycles of operation having one or more operating parameters.

In some applications, the treating chamber can be a low pressure chamber for enabling and promoting evaporation of water from laundry items. Differing conditions, non-limiting examples of which can include pressure differences and temperature differences, between an area within the treating chamber and an area outside of the treating chamber, or generally between two areas within the laundry treating appliance, can contribute to evaporation of water from laundry items.

Systems or assemblies for water reclamation or water recycling can be employed to remove contaminants from a used liquid and reclaim purified liquid that can then be stored or reused as desired. One common method for reclaiming or recycling water is through vapor compression distillation. In a vapor compression distillation process, influent liquid is brought to the boiling point to effect evaporation. During evaporation, the water is converted to water vapor, while contaminants present in the influent liquid are left behind and can be collected and removed from the assembly. The water vapor is compressed, then moves to a condenser, where it condenses at a higher temperature than the evaporation temperature to allow the energy of condensation to be used for evaporating more water. The condensed effluent distillate can be output from the water reclaiming assembly to be stored or re-used.

BRIEF SUMMARY

In one aspect, the disclosure herein relates to a motor assembly for a laundry treating appliance, the motor assembly comprising an impeller housing; a compressor housing defining at least one cooling cavity and disposed within the impeller housing; a compressor motor disposed within the compressor housing and fluidly coupled to the at least one cooling cavity; an impeller mechanically coupled to the compressor motor and disposed within the impeller housing; and a cover for the impeller housing, the cover defining a compressor inlet.

Figure 7:
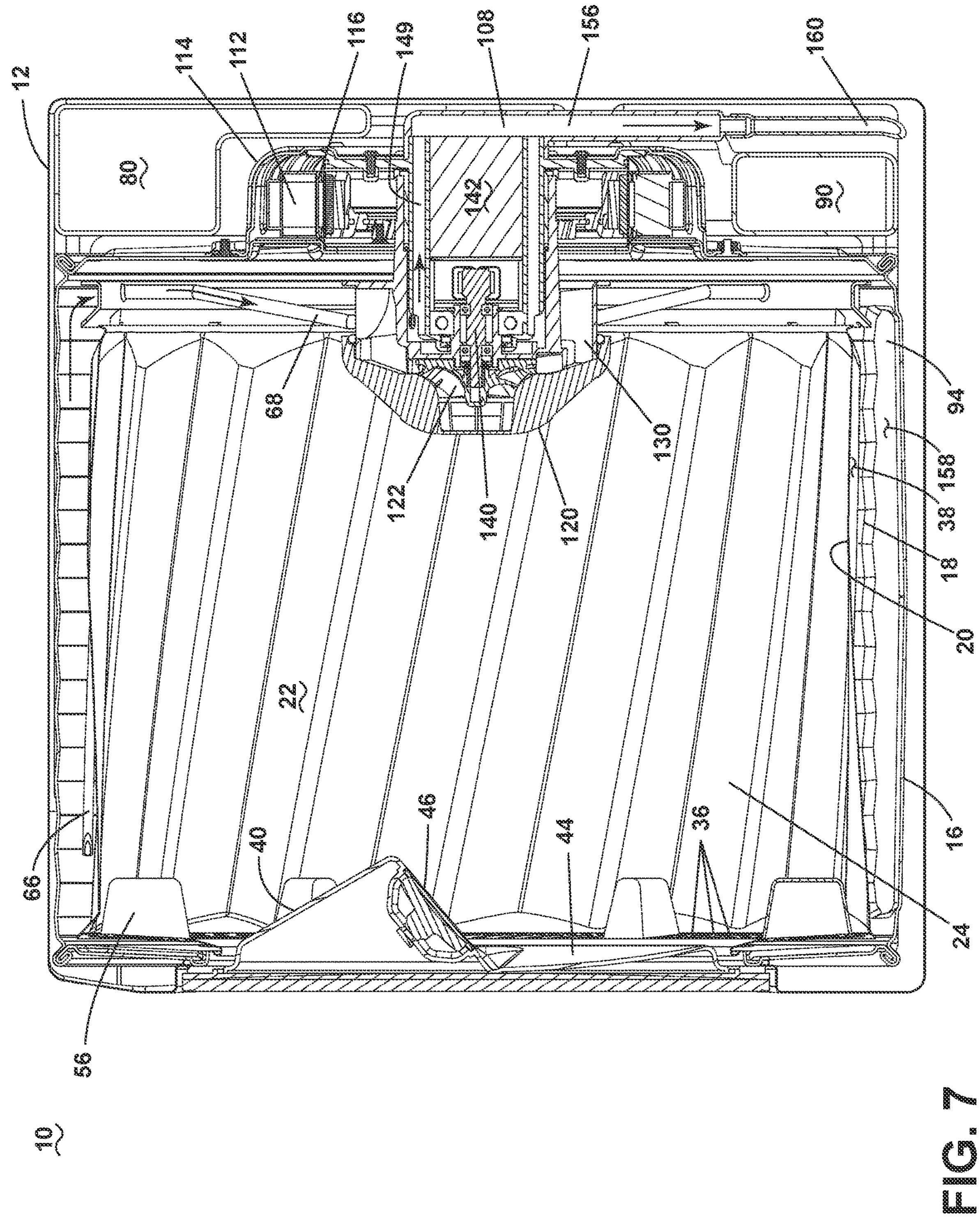
FIG. 7 is an assembled cross-sectional perspective view of the combination washer/dryer of FIG. 1.

FIG. **7*a* is the same assembled cross-sectional perspective view of the combination washer/dryer of FIG. 7** with some of the 3-D lines removed for clarity.

Figure 8:
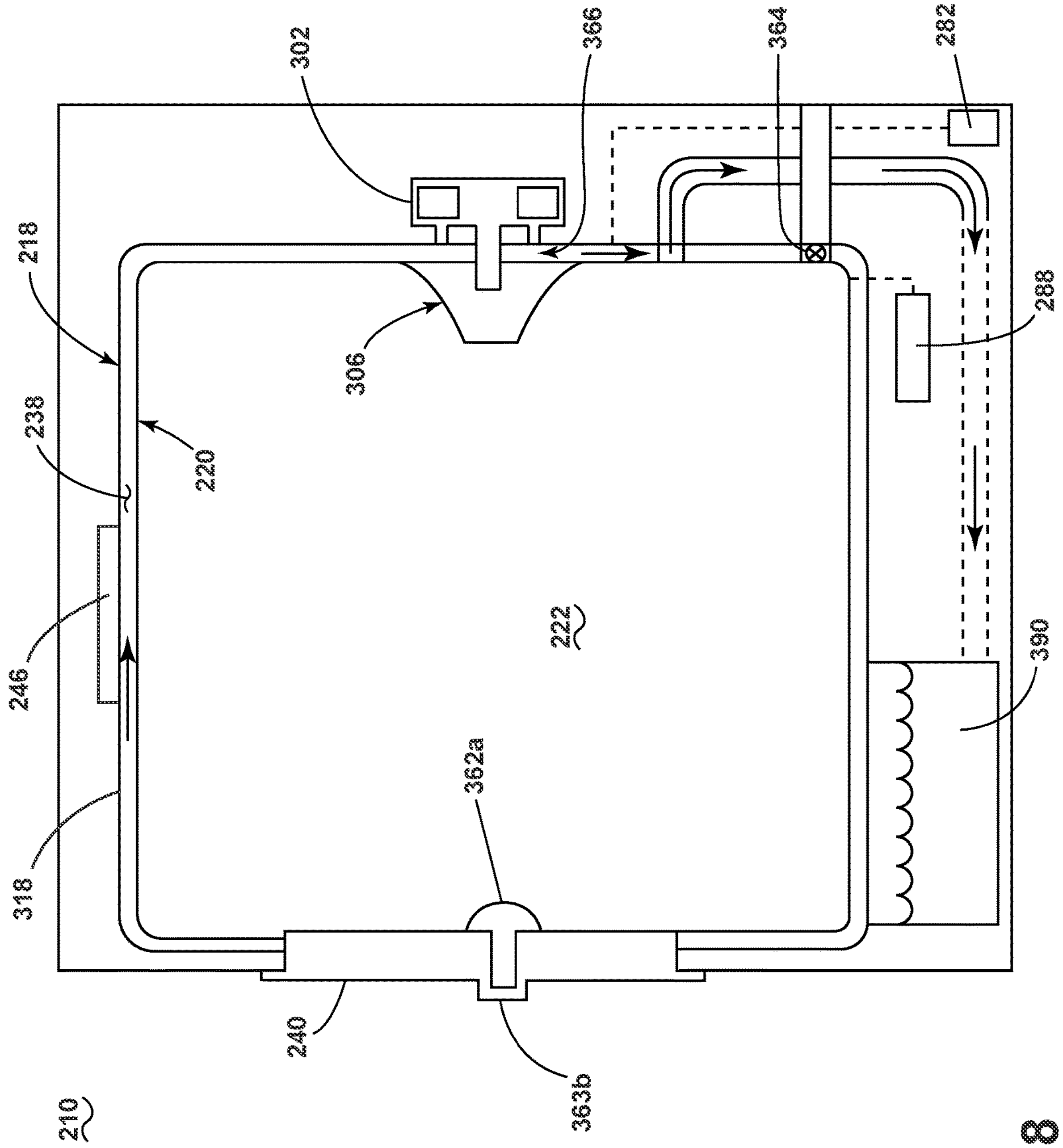

FIG. 8 is a schematic view of a laundry treating appliance in the form of a dryer according to another aspect of the disclosure herein.

Figure 9:
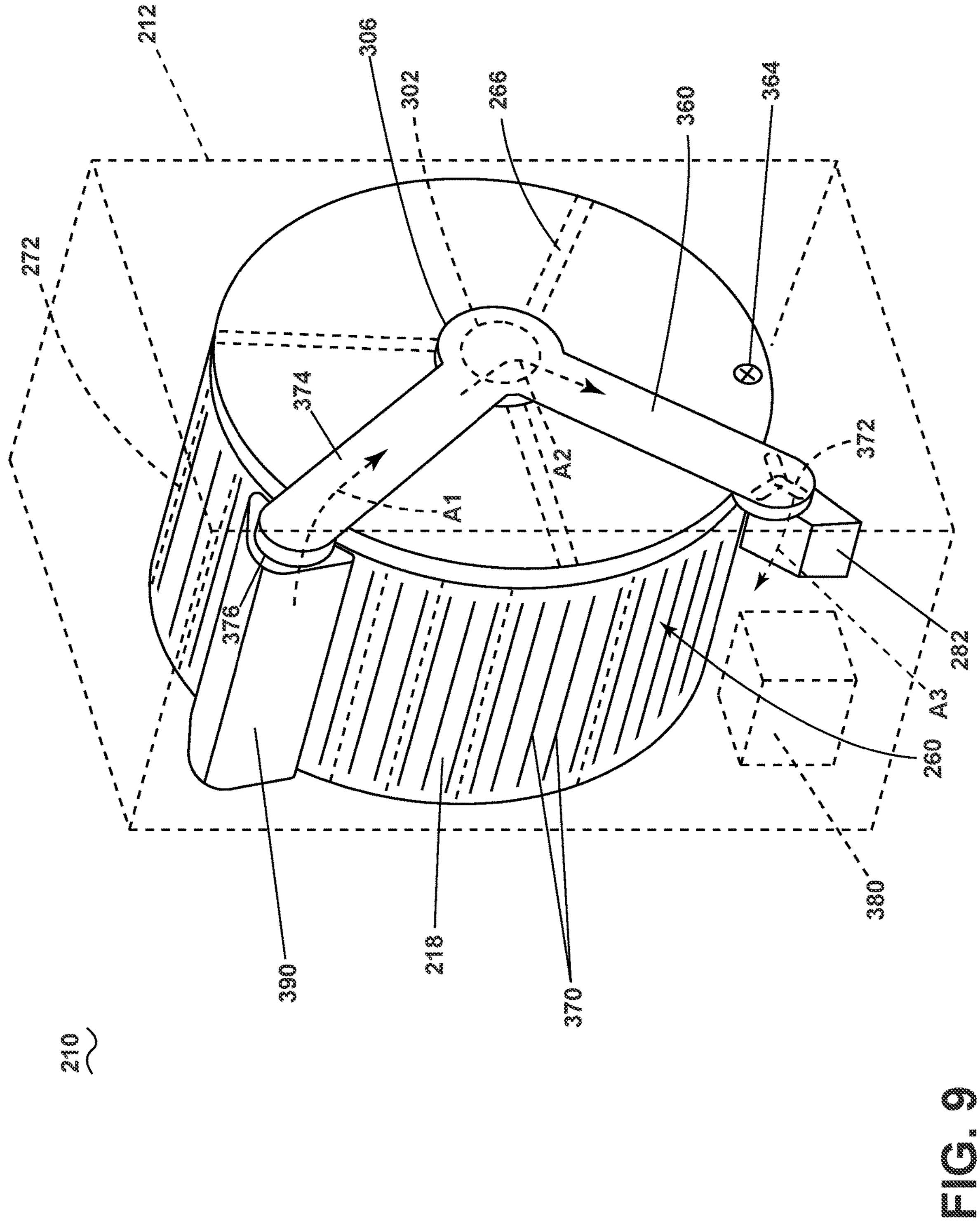

FIG. 9 is a perspective rear view of the dryer from FIG. 8 according to an aspect of the disclosure herein.

DETAILED DESCRIPTION

Aspects of the present disclosure relate to a laundry treating appliance having a drum with an inner and outer wall that utilizes a vacuum pump to create a negative pressure between the inner and outer walls to enable and promote evaporation, including flash evaporation, during a drying cycle. Flash evaporation is an extremely high rate of evaporation that can occur when water suddenly finds itself in a condition that is above the boiling point defined by the pressure and temperature of the water. The laundry treating appliance can be a washer/dryer combination or a stand-alone dryer.

Traditional vapor compression distillation assemblies and processes for distillation or reclamation of water can be effective, but can also be inefficient, employ high operating temperatures, and use expensive materials for construction. Heating the liquid to the boiling point for evaporation calls for significant energy input and can result in long start-up times for the system to warm up to appropriate operating temperatures. As a result, there is either a significant lag time to allow for pre-heating from a cold start, which can take several hours, or the assembly must be run as a steady state process, such as a standby mode which continuously maintains preheat temperature so that startup can occur quickly, which wastes energy. The high temperatures sustained within the vapor compression distillation assembly create a need to use expensive materials that can withstand the high temperatures without cracking or damage, as well as for insulative materials to be incorporated to reduce the amount of heat energy lost from the vapor compression distillation assembly. Additionally, after evaporation and condensation, the distillate liquid can also have a high temperature, which may not be suitable for the desired end use, for example, if the distillate is intended to be used for immediate washing or rinsing with cold water.

While the laundry treating appliance described herein has a horizontal axis, the exemplary laundry treating appliance is not limited to implementations in a horizontal axis laundry treating appliance. Depending on the implementation, a vertical axis dryer or a combination washing machine and dryer; a tumbling or stationary refreshing/revitalizing machine; an extractor; or a non-aqueous washing apparatus; can all be suitable environments for the disclosure as described herein.

As used herein, the term "vertical axis" and "horizontal axis" refer to the manner in which mechanical energy is primarily applied to laundry treated in the laundry treating appliance and is not an express limitation on the operational axis of the appliance. For vertical axis washing machines, a clothes mover, such as an impeller, pulsator, agitator, etc., rotates or reciprocates within a basket, which is typically stationary at the time, about a generally vertical axis to impart mechanical energy to the laundry. In a horizontal axis washing machine, a drum or basket is rotated about a generally horizontal axis to lift the laundry, which then falls in response to gravity. The repeated lifting/falling, which is referred to as tumbling, provides the mechanical energy to the laundry. In either machine the rotational axis need not be perfectly vertical or horizontal, as the case may be. It is acceptable that the axis be at an angle of inclination to the vertical or horizontal axis.

Figure 1:
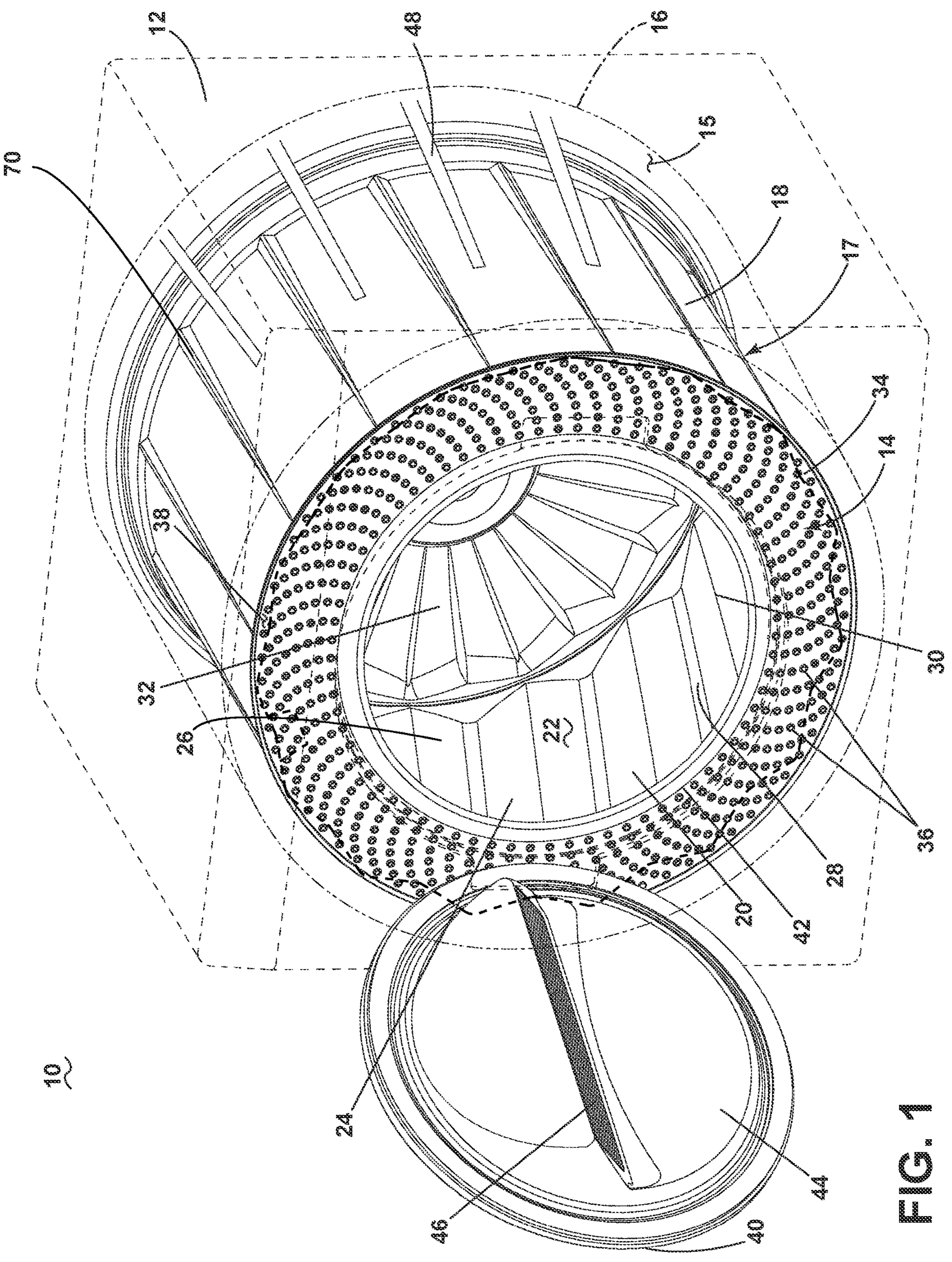
FIG. 1 is a perspective view of a laundry treating appliance in the form of a combination washer/dryer according to an aspect of the disclosure herein.

FIG. 1 is a schematic view of a laundry treating appliance in the form of a combination washer/dryer 10. The combination washer/dryer 10 includes a structural support system comprising a cabinet 12 which defines a housing within which a laundry holding system 14 resides. The cabinet 12 can be a housing having a chassis and/or a frame defining an interior enclosing components typically found in a conventional combination washer/dryer, including but not limited to motors, pumps, fluid lines, controls, sensors, transducers, and the like. Only components necessary for a complete understanding of the disclosure set forth herein will be described in more detail as necessary.

The laundry holding system 14 can include a tub 16 supported within the cabinet 12 by a suitable suspension system and a drum assembly 17 provided within the tub 16. An external containment cavity 15 can be defined as the space between the tub and the drum assembly 17. The drum assembly 17 can include an outer drum 18 and an inner drum 20 provided within the outer drum 18 and defining an interstitial space 38 between the outer drum 18 and the inner drum 20. The outer drum 18 can include drain ribs 70. The inner drum 20 further defines at least a portion of a laundry treating chamber 22. An interior wall 24 defining the inner drum 20 can include integral lifts 26 such that the interior wall 24 has a wave form with circumferentially spaced troughs 28 and crests 30. Integral can refer to a structure that is one-piece or monolithic, such that the integral lifts 26 are part of the structure forming the inner drum 20. While illustrated as integral lifts 26, it is contemplated that the interior wall 24 can include conventional lifts coupled to the interior wall 24 and circumferentially arranged about the laundry treating chamber 22.

A rear inner wall 32 and a front inner wall 34 define at least a portion of the laundry treating chamber 22. The front inner wall 34 can have perforations 36 fluidly coupling the laundry treating chamber 22 to the external containment cavity 15. The inner drum 20 extends along a substantially horizontal axis between the rear inner wall 32 and the front inner wall 34. It should be noted and will be explained in more detail herein that the laundry treating chamber 22 and the interstitial space 38 between the outer and inner drums 18, 20 are isolated from each other to an extent that a pressure difference can be established between the two spaces.

A door 40 can be movably mounted relative to the cabinet 12, by way of non-limiting example rotatably mounted to the left side of an opening 42 in the cabinet 12 through which laundry can be received within the laundry treating chamber 22. The door 40 can selectively close both the tub 16 and the laundry treating chamber 22. The door 40 can seal only against the tub 16 while leaving small gaps between the drum assembly 17 and the tub 16. The small gaps ensure that clothing articles remain within the treating chamber 22. An inner surface 44 of the door 40 defines a portion of the laundry treating chamber 22 when the door 40 is closed. A heater 46, by way of non-limiting example an infrared heating element, can be mounted to the inner surface 44 of the door 40. It is further contemplated that the heater can be located in any suitable location including a sump 94 (FIG. 3) for heating both the water during a wash cycle and the drum assembly 17 during a dry cycle along with the air during a de-wrinkling cycle. At least one nozzle 48 can be provided between the tub 16 and the outer drum 18 within the external containment cavity 15. The at least one nozzle 48 can be fluidly coupled to any number of water supplies to supply water to the tub 16.

Figure 2:
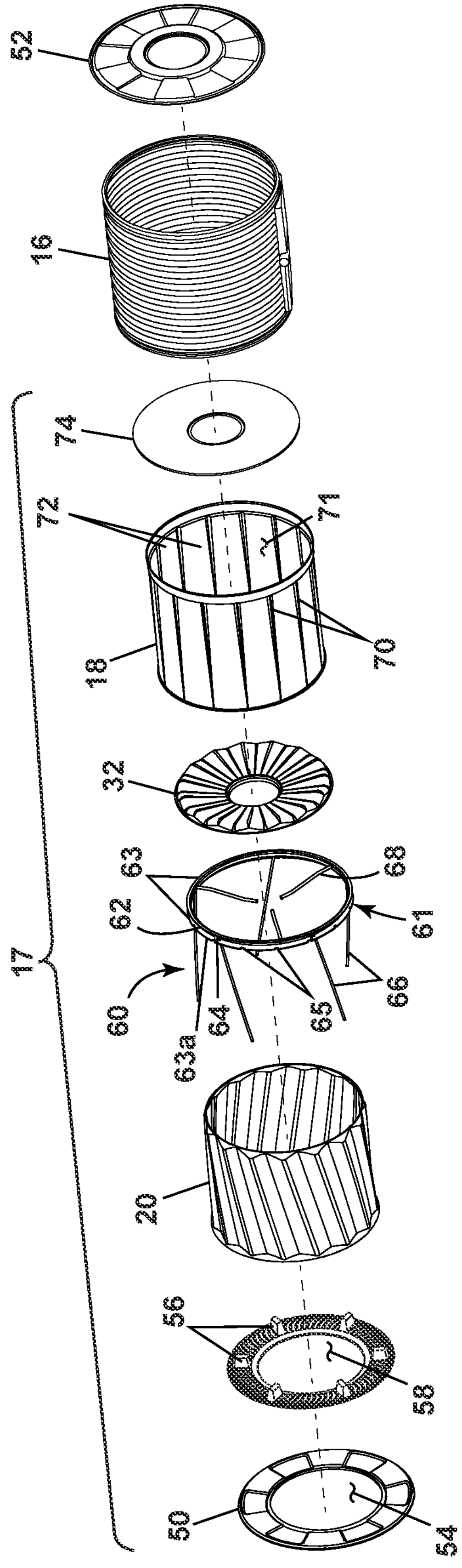
FIG. 2 is an exploded view of a tub and drum assembly with a vent and drain system for the laundry treating appliance of FIG. 1.

FIG. 2 is an exploded view of the tub 16 and drum assembly 17 where it can more clearly be seen that the front inner wall 34 can include a plurality of lifters 56 circumferentially arranged about an opening 58. Lifters 56 can aid in lifting and tumbling laundry during operation, while integral lifts 26 can also perform a similar function while also directing water as will be described in more detail herein. The tub 16 can extend axially between a front and rear bulkhead 50, 52. The front bulkhead 50 includes an opening 54. The lifters 56 extend axially from the front inner wall 34. Openings 54 and 58 are axially aligned with opening 42 in the cabinet 12 when assembled. The inner drum 20 can be sealed at the rear by the rear inner wall 32. The rear inner wall 32 can be a ribbed wall as illustrated to direct water and engage laundry items during operation.

A vent and drain system 60 can be disposed in the interstitial space 38 (FIG. 1). A coupling ring 61 can be formed to receive the inner drum 20 and circumscribe the outer drum 18. A drain channel 62 formed by axially spaced channel walls 63 can be provided at the coupling ring 61. The drain channel 62 can include lift walls 64 axially extending between the axially spaced channel walls 63. Circumferentially spaced notches 65 can be disposed along an inner channel wall 63*a*. A plurality of collection conduits 66 can extend axially from the coupling ring 61. A plurality of drain conduits 68 can extend radially inward from the drain channel 62. While illustrated as five collection conduits 66 and three drain conduits 68, it should be understood that any number or combination of collection conduits and drain conduits is contemplated and is not meant to be limited by those illustrated.

The outer drum 18 includes the drain ribs 70 forming at least a portion of a collection of circumferentially disposed collection channels 72 within the outer drum 18. The drain ribs 70 form conduits along an interior surface 71 of the outer drum 18. The outer drum 18 can be sealed at the rear by a rear outer wall 74.

Figure 3:
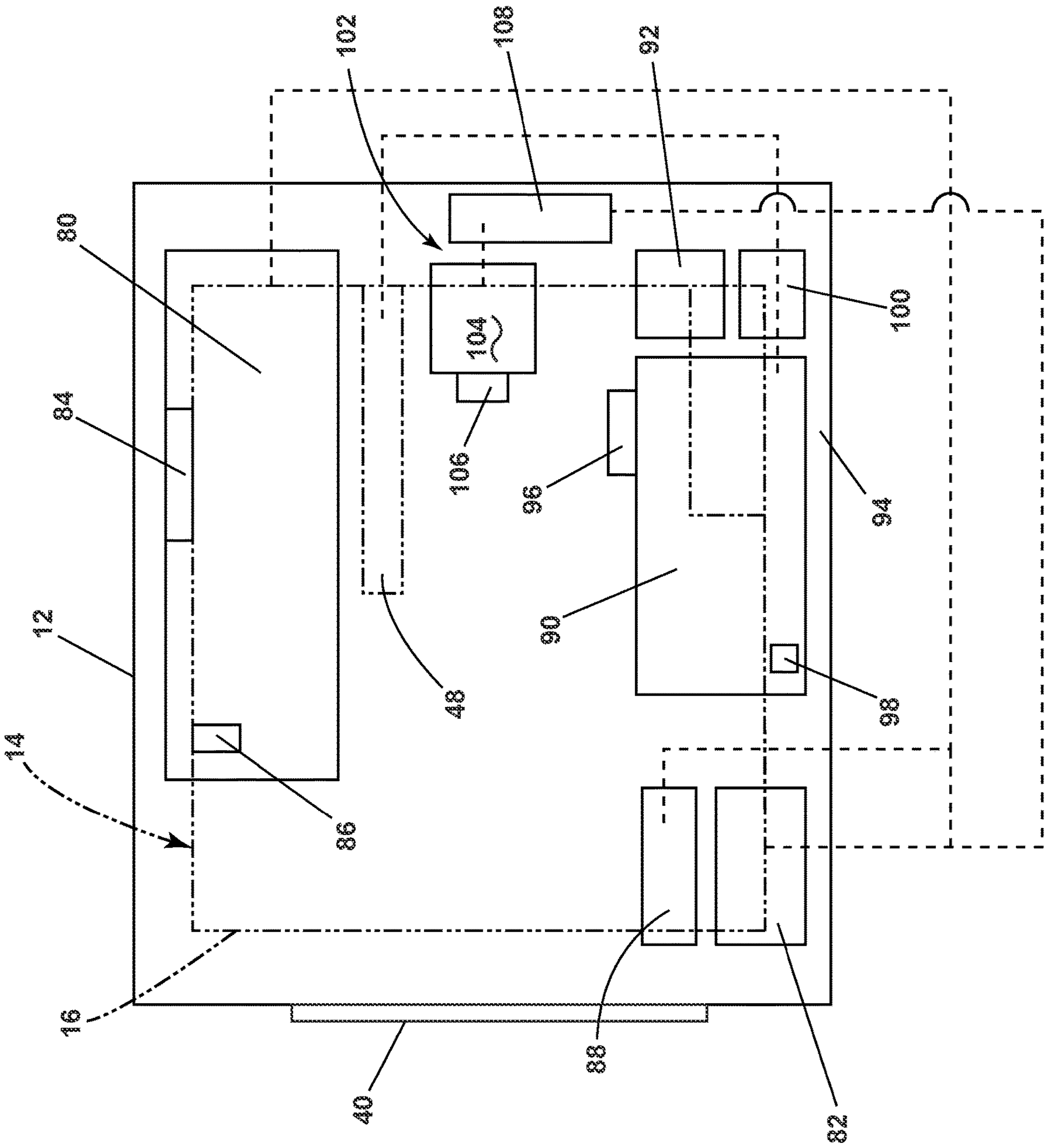
FIG. 3 is a schematic of the combination washer/dryer including a motor assembly.

A schematic of the combination washer/dryer 10 is illustrated in FIG. 3 with the laundry holding system 14 including only the tub 16 and one nozzle 48 in dashed line for clarity purposes only with it being understood that the drum assembly 17 is in place as described herein. The combination washer/dryer 10 can include a reuse tank 80 fluidly coupled to a pump, illustrated herein as a vacuum pump 82. It will be understood that the pump can be any suitable compressor or pump for creating a negative pressure relative to atmospheric pressure, including, by way of non-limiting example, a compressor or vacuum pump such as a positive displacement pump, an impeller driven compressor, or a piston pump compressor. A first vent 84 can be located at the top of the reuse tank 80 to vent air in and out as the reuse tank 80 is filled or drained. The first vent 84 can also vent non-condensable gases pumped into it. Non-condensable gases can be present in the liquid within the combination washer/dryer 10 as it is removed from laundry items. Non-condensable gases can include, by way of non-limiting example, gases dissolved in the liquid, other volatiles that may be present in the liquid, air that may be left within the laundry holding system 14 after the draw down to negative pressure due to an imperfect vacuum, or air that may leak into the laundry holding system 14 due to imperfect seals. It is also contemplated that a sensor 86, by way of non-limiting example a conductivity sensor, is located within the reuse tank 80 to detect if the reuse tank 80 is full. By way of non-limiting example the reuse tank 80 can hold 25 to 32 liters of a liquid.

A flash evaporation starter 88 can be fluidly coupled to the reuse tank 80. It is contemplated that the flash evaporation starter is directly coupled to the reuse tank 80 or indirectly coupled to the reuse tank 80 via the vacuum pump 82. The flash evaporation starter 88 can be any apparatus to encourage flash evaporation of the liquid present within the laundry holding system 14. Non-limiting examples of such an apparatus include a heating element or heater or an additional pump or compressor to aid in creating the negative pressure within the laundry holding system 14. The heating element or heater can be located within a small pressure vessel to superheat a small volume of water that can be injected into the laundry holding system to provide an initial high volume of water vapor to begin the vapor compression process.

The combination washer/dryer 10 can also include a process tank 90. The process tank 90 can be formed with a capacity of, by way of non-limiting example 18 liters to 25 liters. The process tank 90 can be fluidly coupled to a transfer pump 92 for moving water from a sump 94 to the process tank 90, by way of non-limiting example at the end of a wash cycle or during/after a rinse cycle. It is further contemplated that a second vent 96 is located at a high point of the process tank 90 to allow air in or out as the process tank 90 is filled or drained. A second sensor 98, by way of non-limiting example a float sensor, can be located within the process tank 90 to prevent from over filling.

A flow control mechanism 100, by way of non-limiting example a pump, such as a positive displacement pump, or a valve, is fluidly coupled to the process tank 90 to allow water to be drawn or pumped from the lowest point in the tank into the at least one nozzle 48. During operation, low pressure within the tub 16 can cause water from the process tank 90 to be drawn into the at least one nozzle 48 without the need of a pump or valve. Therefore, it is contemplated that in some aspects of the disclosure herein no flow control mechanism 100 is required.

A motor assembly 102 can include a motor 104 mechanically coupled to the laundry holding system 14 for rotating the tub 16 and/or the drum assembly 17. It should be understood, that while the motor assembly 102 can be used for rotation of the tub 16, a non-rotating tub is also contemplated and the motor assembly can be utilized for other mechanisms. A compressor assembly 106 can be part of the motor assembly 102. A rear manifold 108 can be fluidly coupled to the compressor assembly 106 for moving fluids, including but not limited to condensate and condensable gases out of the laundry holding system 14 via the vacuum pump 82 to the reuse tank 80.

Figure 4:
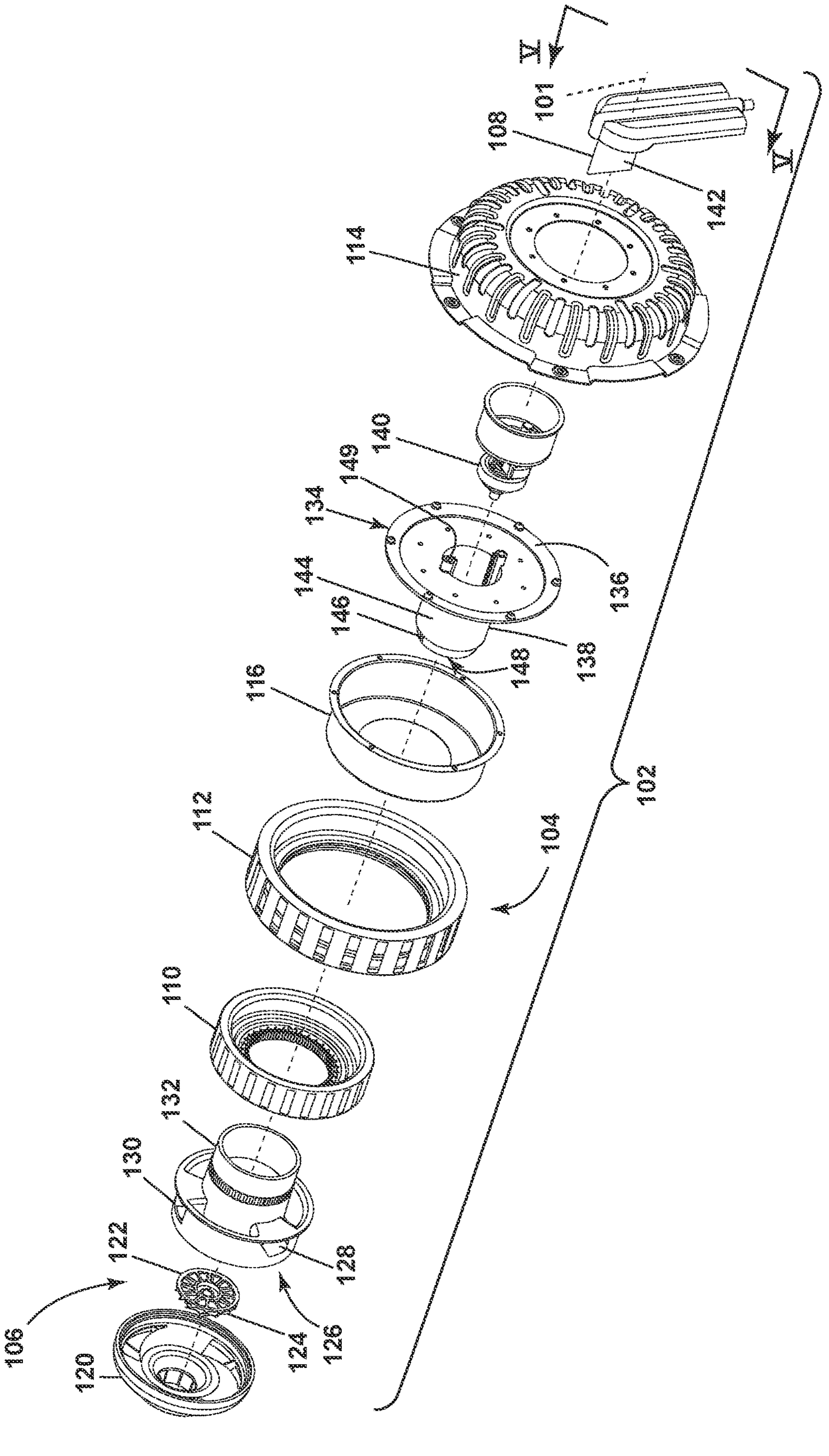
FIG. 4 is an exploded view of the motor assembly of FIG. 3 according to an aspect of the disclosure herein.

FIG. 4 is an exploded view along an axis of rotation 101 of the motor assembly 102 according to an aspect of the disclosure herein. The motor assembly 102 can include the motor 104 for driving the tub 16 and/or drum assembly 17 and can include the compressor assembly 106. The motor 104 can include a rotor 110 and a stator 112. When assembled the stator 112 circumscribes the rotor 110 and is mounted to a stator mounting plate 114. A separating wall 116 in the form of an open cylinder, can extend between the rotor 110 and the stator 112.

The compressor assembly 106 can include an impeller 122 with a cover 120. The impeller 122 can be have a standard impeller shape by way of non-limiting example a frusto-conical shape as illustrated. This shape is for illustrative purposes only and not meant to be limiting. Impeller vanes 124 can extend radially outward from a central axis of the impeller 122 corresponding to the axis of rotation 101. An impeller housing 126 can include a first cylindrical portion 130 for housing the impeller 122 and a second cylindrical portion 132, by way of non-limiting example circumferentially smaller than the first cylindrical portion 130, for receiving a compressor motor housing 134. The impeller housing 126 can include openings 128 through which fluids can flow. The impeller housing 126 can couple with the impeller 122 such that when the impeller 122 is operating fluids within the impeller vanes 124 can be ejected through the openings 128.

Figure 5:
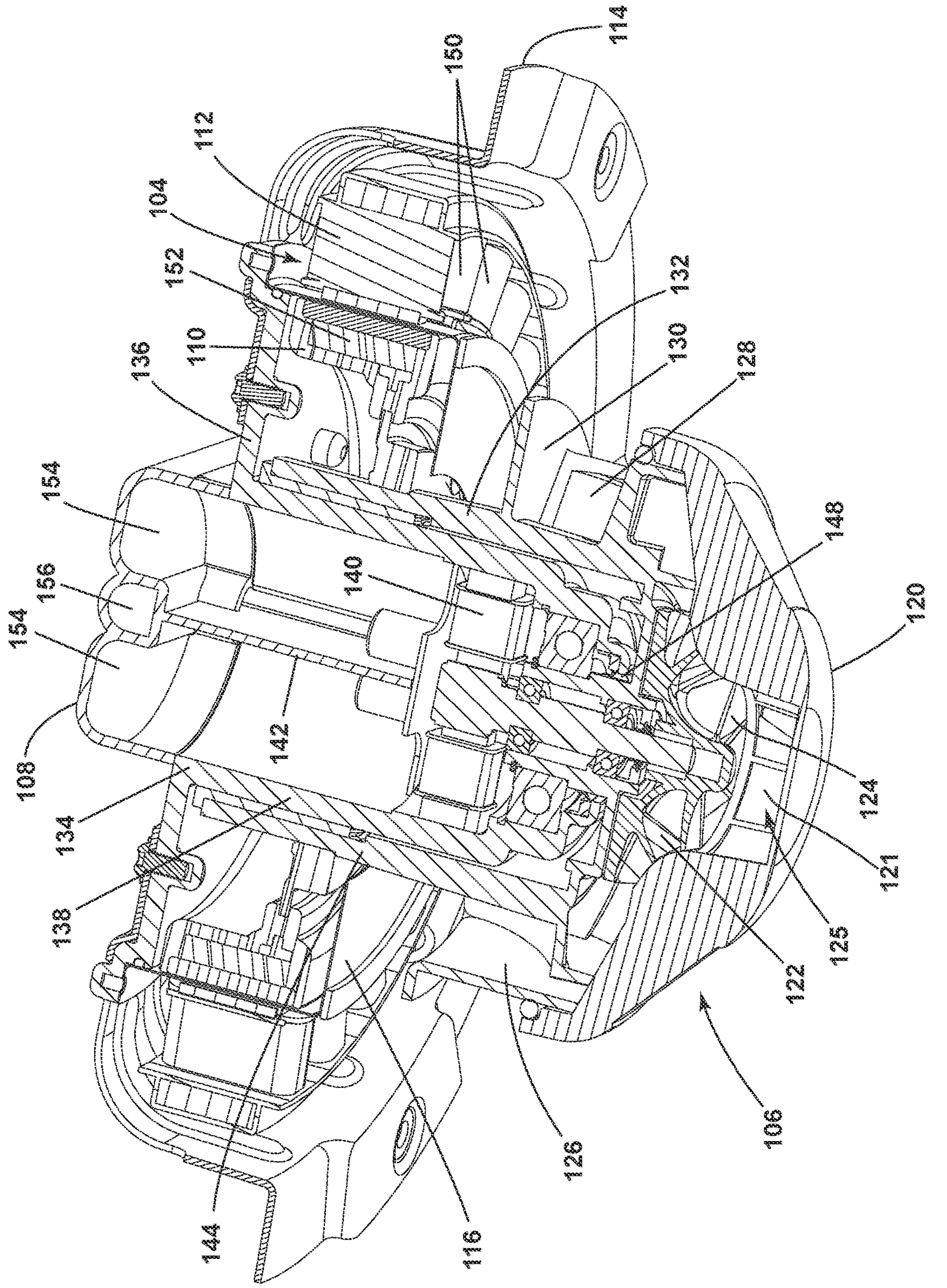
FIG. 5 is an assembled cross-sectional view of the motor assembly from FIG. 4.

The compressor motor housing 134 can include a circular base 136 from which a cylindrical housing 138 extends axially towards the cover 120. The cylindrical housing 138 includes a cylindrical wall 144 extending from the circular base 136 and terminating in a tapered end 146 with an opening 148 (FIG. 5). A connection conduit 149 can extend within the cylindrical wall 144 in a direction substantially parallel to the axis of rotation 101. While illustrated as parallel to axis of rotation 101, it should be understood that the connection conduit 149 can be disposed in any functional direction or orientation. A compressor motor 140 can extend through the cylindrical housing 138 with a portion extending through the opening 148 to mechanically couple to the impeller 122. The rear manifold 108 includes a dividing arm 142 received within the cylindrical housing 138.

FIG. 5 is an assembled cross-sectional view of the motor assembly 102 taken along line V-V of FIG. 4. The stator 112 can include a plurality of circumferentially spaced windings 150. A plurality of corresponding circumferentially spaced magnets 152 are disposed within the rotor 110. The rear manifold 108 includes two cooling cavities 154 for introducing cooling air to the compressor motor 140, where at least one cooling cavity provides heated air exhaust. The rear manifold 108 can also include an exit conduit 156 fluidly coupling the vent and drain system 60 to the reuse tank 80 via the vacuum pump 82 (FIG. 3). It can more clearly be seen that the impeller 122 defines a collection of circumferentially arranged openings 121 within the cover 120 to define a compressor inlet 125.

Figure 6:
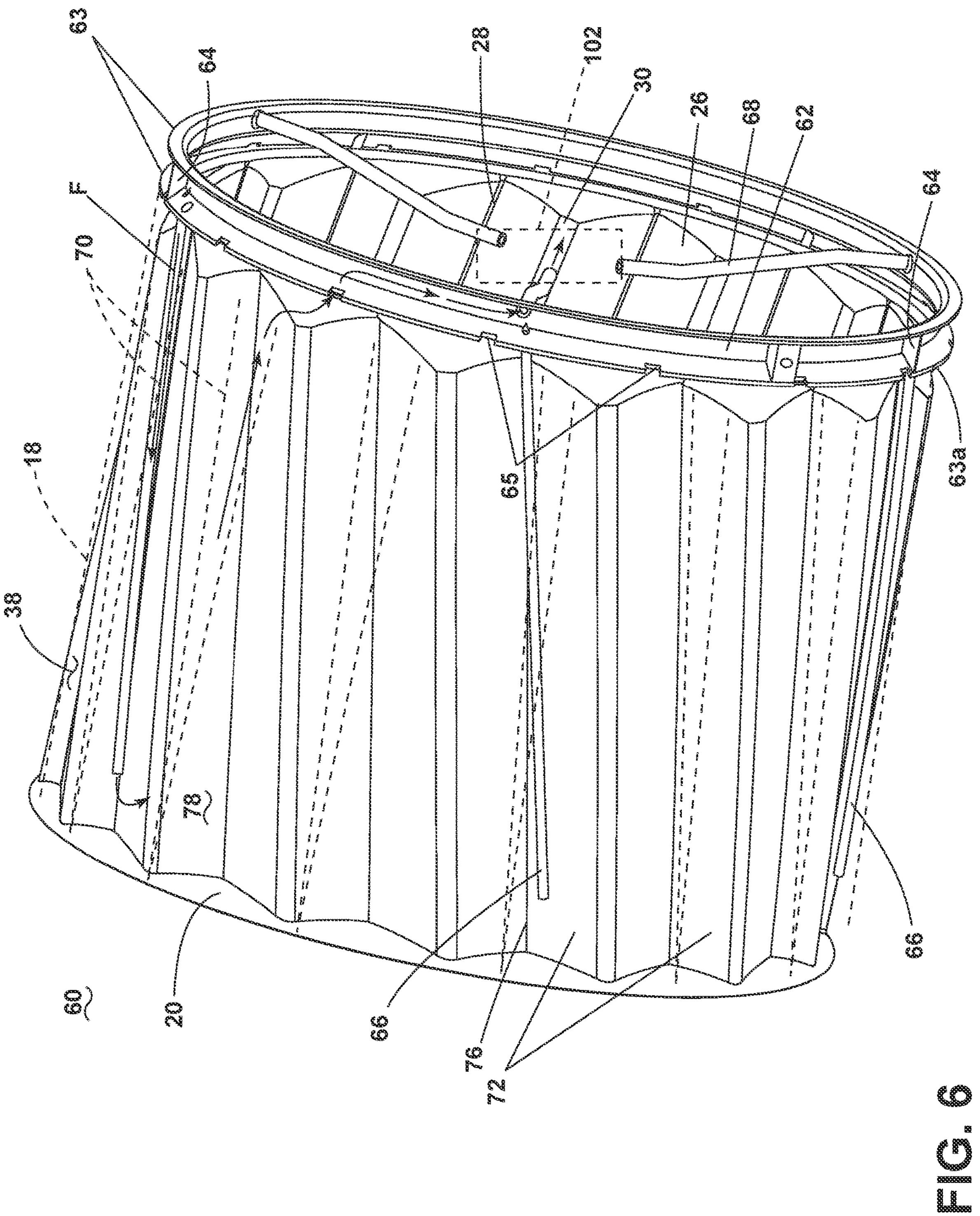
FIG. 6 is an assembled perspective view of the vent and drain system of FIG. 2 according to an aspect of the disclosure herein.

FIG. 6 is an assembled perspective view of the vent and drain system 60 coupled to the inner drum 20 with the outer drum 18 illustrated in dashed line for clarity. The integral lifts 26 define at least a portion of the circumferentially disposed collection channels 72. The crests 30 as described in FIG. 1 form outer troughs 76 along an outer surface 78 of the inner drum 20. The plurality of collection conduits 66 fluidly couple the interstitial space 38 between the outer and inner drums 18, 20 to the drain channel 62. The plurality of drain conduits 68 fluidly couple the drain channel 62 to the motor assembly 102. During operation, due to the combination of the compressor and an extreme volume change that occurs when a gas condenses to a liquid, compressed water vapor will move from right to left with respect to FIG. 6 along outer surface 78 of the inner drum 20. In turn non-condensable gasses will also move to the left end of channels 72. The collection conduits 66 are provided to enable an exit of these non-condensable gasses from a trap formed at the left end of the collection channels 72. The drain ribs 70 facilitate the movement of condensate formed along the interior surface 71 (FIG. 2) of the outer drum 18. The condensate moves within the channels 72 due to a rotation of the outer drum 18 at, by way of non-limiting example 130 rpm producing around 5 g, causing the much denser condensate to accumulate on the interior surface 71 of the outer drum 18 within the drain ribs 70, which are sloped to collect condensate prior to extraction through drain conduits 68. Extraction through the drain conduits 68 can occur when the drum is slowed at regular intervals to redistribute clothing within the treating chamber 22.

Turning to FIG. 7, an assembled cross-sectional perspective view of the combination washer/dryer 10 is illustrated. The connection conduit 149 can fluidly couple the plurality of drain conduits 68 to the exit conduit 156. A drain pipe 160 can fluidly connect the exit conduit 156 to the reuse tank 80 via the vacuum pump 82 (FIG. 2), thus also fluidly connecting the interstitial space 38 with the reuse tank 80 and vacuum pump 82.

A method of draining fluids disposed within the vent and drain system 60 can include flowing fluids (F) through the collection channels 72. The drain ribs 70 can facilitate the flow of fluids (F), including but not limited to condensate and condensable gases, through the collection channels 72 and into the collection conduits 66. The method can further include draining the fluids (F) into the drain channel 62 via the notches 65. Collecting the fluids (F) in the collection conduits 66 can be facilitated by the lifts walls 64 through rotation. The lift walls 64 can form a "ferris wheel" for the water, lifting the water as the coupling ring 61 turns to a point where gravity works to pull the water down through the drain conduits 68. The method can further include disposing fluids (F) into the motor assembly 102.

The method can further include removing the fluids (F) through the exit conduit 156 via the connection conduit 149 and moving the fluids (F) into the reuse tank 80. The fluids (F) drain out when the outer drum 18 has slowed so that there is less than 1 g of force on the outer or inner drums 18, 20. The movement of the fluids (F) during such a draining method through the collection channels 72, collection conduits 66, drain conduits 68, and into the exit conduit 156 to the reuse tank 80 can be facilitated completely by gravity. The drum must be slowed intermittently to drain out condensate that collects in drain channel 62.

The combination washer/dryer 10 can perform washing and drying of clothing, as well as distilling any water used in washing to remove soil, detergents, water mineral hardness, etc. in order for the used water to be reused in a subsequent cycle. By way of non-limiting example, laundry items can be treated in 18 liters of water. Upon completion of a treatment cycle, used water can be drained into the process tank 90.

In an exemplary cycle, the reuse tank 80 can hold 32 liters, providing a wash amount of 18 liters and two smaller 7 liter amounts provided directly from the reuse tank, can be used to rinse the treated laundry items. The smaller amount of water can be extracted via a spin cycle to, by way of non-limiting example 125% RMC (Remaining Moisture Content by weight). Typical horizontal washing machines extract 40%-50% RMC by spinning at high speeds producing g-forces ranging from 250 to 500 g's in order to extract water to these levels. In order for a 125% RMC to be achieved only speeds of between 120 and 140 rpm producing 3-7 g's is necessary. A lighter and less robust suspension system would be required and out of balance forces would be far less than in a typical washing machine. It is further contemplated that no suspension system at all would be required. A rubber boot typical for large vibrations and damping can also be eliminated in the combination washer/dryer 10 as described herein.

During the rinse cycle, water can be sprayed on the inside of the laundry items while the laundry items are held against the interior wall 24 of the inner drum 20 during, by way of non-limiting example, a 5 g spin. A slight slope of the inner drum 20 would cause used rinse water to flow toward the front inner wall 34 and through the perforations 36 in the front inner wall. Rinse water would then flow within the external containment cavity 15 to the sump 94. The flow of used water can be further facilitated by the troughs 28 of the integral lifts 26. This used water can also be transferred to the process tank 90 leaving 5 or 6 liters in the clothing to be extracted during a dry cycle.

The reuse tank 80 can be configured to hold liquid, which can include both water from condensation and a small amount of water vapor together with any non-condensible gases vented during a drying/distillation cycle. Any water from the vacuum pump 82 can be discharged into the reuse tank 80. In order to further conserve water vapor, the water vapor can be condensed as it passes through any condensate already in the reuse tank 80. Air and non-condensible gases can be vented in and out of the reuse tank via the vent 84. The sensor 86 can detect if the reuse tank 80 is full. At the commencement of a wash cycle, the condensed water can be drained into the treating chamber 22 by the opening of a valve due to gravity.

At the end of the wash cycle and during/after the rinse cycle, the transfer pump 92 can move the water from the sump 94 at the bottom of the treating chamber 22 into the process tank 90. When the wash cycle and/or rinse cycle have been completed and the drying and distillation cycle is to be commenced, the flow control mechanism 100 can allow water to be drawn from the process tank 90 into the at least one nozzle 48 to spray the used water on external surfaces of the outer drum 18 so that the water can be distilled.

When the drying and distillation cycle is commenced, evaporation of the water is initiated. In an exemplary embodiment, the initiation of the evaporation is a flash evaporation step. Vapor compression distillation methods can utilize heat in order to begin flash evaporation. Aspects of the present disclosure provide for a vapor compression distillation in which the need for heat to begin flash evaporation is reduced by instead or in addition using reduced pressure to cause flash evaporation while requiring less heat. The vacuum pump 82 can be operated to reduce the pressure within the treating chamber 22 to a negative pressure relative to atmospheric pressure. Specifically, the vacuum pump 82 can reduce the pressure within the treating chamber 22 by operating to draw air out of the treating chamber 22 and create a low pressure environment. The pressure within the treating chamber 22 can be reduced to the point at which the liquid spontaneously boils and flash evaporates. By reducing the operating pressure sufficiently, distillation and flash evaporation can occur at or near room or ambient temperature. This reduces start-up time requirements, and removes some high temperature-related needs for costly materials and insulation. Rather than lengthy pre-heating times, the initial draw down phase according to aspects of the present disclosure can be as short as minutes or seconds. An additional heating element, heater, pump, or compressor can aid in creating the negative pressure within the treating chamber 22. Additionally coating the exterior of the outer drum wall 18 with a coating such as Cerakote™, or any suitable coating with a black body emissivity in the ninety percentile range, can enable absorbing of the infrared (IR) radiation from the heater 46 more readily than a stainless surface which typically has very low IR absorption. With a near vacuum state, transferring heat by convection is limited. By way of non-limiting example, an electric tubular heater, such as a Calrod heater, can be designed to radiate at 95% and above efficiency in the infrared spectrum, so that most of the energy can be transferred into the drum to build up the rate of evaporation over a period of time needed for the process.

It is contemplated that when the treating chamber 22, and more specifically the external containment cavity 15, is at a low pressure or near vacuum state, no additional pump or flow control mechanism is required for moving the used water from the process tank 90 into the nozzles 48. Due to the low pressure or near vacuum state of the external containment cavity 15, water will naturally flow from the process tank 90 into the at least one nozzle 48 toward the lower pressure or vacuum state of the external containment cavity 15. As long as the flow rate of water is low compared to the gas removal rate of the vacuum pump 82, the vacuum pump 82 can be utilized. If the vacuum pump 82 is not sufficient to provide a required spraying pressure, it is contemplated that an additional pump, which can be, by way of non-limiting example, a small diaphragm pump, can be utilized to pump the dirty water to be distilled onto external surfaces of the outer drum 18.

Pumping water onto the external surfaces of the outer drum 18 can improve the efficiency of the vapor compression distillation process by allowing for the energy of condensation after the initial flash evaporation occurs to be transferred back through the outer drum 18 to sustain further evaporation. The exterior surface area of the outer drum 18 can serve to encourage and maximize evaporation performance, in addition to the use of low pressure or heat to cause spontaneous boiling and flash evaporation. This can serve to keep the distillation process going without requiring additional input of energy or while requiring minimal additional input of energy to the system. Additionally, the resulting distillate can be at or near room temperature, so it can be used for many end purposes without the need for cooling the distillate. The second sensor 98 can determine when all the water has been distilled.

The flash evaporation can be thought of as a method for rapidly initiating the vapor compression distillation process, and can also result in a slight reduction in the temperature of the treating chamber 22 and the outer drum 18. Thus, in order for subsequent evaporation to continue, the heat lost during flash evaporation can be replaced by the heat of condensation that transfers through the outer drum 18 to sustain evaporation once the flash evaporation has initiated the process. It will be understood that the flash evaporation can provide a high rate of evaporation for a short period of time until the condensation portion of the process begins and serves to sustain the evaporation.

Upon commencing a dry cycle, when the vacuum pump 82 and compressor assembly 106 are turned on, a low pressure, or near vacuum, environment can be produced, which can be specifically in the external containment cavity 15, to further extract used water from the laundry items. The compressor assembly 106 can include a compressor to pump the external containment cavity 15 to between 200 and 300 mBar, leaving the vacuum pump 82 to accomplish the remaining pressure decrease of between 170 and 270 mBar to accomplish a pressure of less than or equal to 30 mBar. In a preparation step for drying the laundry items and/or distilling the used water, the vacuum pump 82 and compressor assembly 106 are turned on and all appropriate valves are closed in order to evacuate the external containment cavity 15 to create a low pressure and near vacuum environment. It is contemplated that depending on the size of the vacuum pump 82, this initial draw-down process can take 8-10 minutes.

In one aspect of the disclosure, the compressor assembly can be a turbo compressor, or 550 Watt compressor. Unlike centrifugal compressors, turbo compressors, or turbo chargers, are capable of generating higher pressure decreases. Utilizing a turbo compressor can provide high power during a draw-down process. A turbo compressor can provide at least 200 mBar of pressure decrease, requiring the vacuum pump 82 to provide at least 800 mBar instead of a full vacuum of 1000 mBar to reach a near vacuum state. Combining the turbo compressor with the vacuum pump 82 reduces the power that would otherwise be needed in the vacuum pump 82 for drawing down the external containment cavity 15 to a low pressure value of at 28 mBar, or as close to zero as possible. This pressure environment enables a flash evaporation at or near room temperature, which can be at or around 23° C.

In one aspect of the disclosure, the spontaneous evaporation can be started when a small amount, by way of non-limiting example 150 cc, of distilled water from the reuse tank 80 is introduced to the flash evaporation starter 88. The flash evaporation starter 88 can be a small heated chamber that when in a closed state is a pressure vessel. Heat, by way of non-limiting example 700 W for 7-10 minutes, can be introduced to the small amount of distilled water in the small heated chamber to produce a super-heated state, which is the phenomenon in which a liquid is heated to a temperature higher than its boiling point, without boiling.

To ignite a vapor compression distillation process, the flash evaporation starter 88 is opened and throttled appropriately in order to release the super-heated distilled water between 15 to 20 seconds into the tub 16. Spontaneous boiling and/or flash evaporation of the liquid within the treating chamber 22 occurs due to the operation of the flash evaporation starter 88 and the reduced pressure environment within the treating chamber 22. Water contained within the liquid is evaporated to water vapor.

Simultaneously, the water vapor that is evaporated from the clothing and from the flash evaporator/starter 88 is drawn into the compressor inlet 125 of the compressor assembly 106 by the impeller 124. The water vapor can come from treating chamber 22, the external containment cavity 15, or both. The water vapor becomes compressed and moves into the interstitial space 38 between the drum walls. The water vapor remains in a modest superheat condition at a higher pressure where condensation can occur in collection channels 72.

Also during the drying and distillation process, the clothing is spun, by way of non-limiting example at 130 rpm to press the clothing against the interior wall 24 of the inner drum 20 with around 5 g's. This speed utilizes all of the surface area of the interior wall 24 of the inner drum 20 by increasing a contact surface area of a laundry item that may have very little actual surface contact at 1 g. The space present in between layers of wet clothing decreases and therefore reduces the heat transfer rate into the clothing. Simultaneously, water from the process tank 90 can be sprayed on external surfaces of the outer drum 18. Water evaporated from the laundry items and condensing on the outer surface 78 of the inner drum 20 along with the distillation taking place on exterior surfaces 118 of the outer drum 18 can equal a total of up to 500 cc/minute evaporation and condensation.

Because the water condensing on the outer surface 78 of the inner drum 20 has a slightly elevated temperature due to the compression process, and then comes into contact with the outer drum 18, which has a lower temperature than the water vapor due to the liquid from the process tank 90 being sprayed on and evaporated from the external surfaces of the outer drum 18, the water vapor is condensed between the inner drum 20 and the outer drum 18, where it then flows to the vent and drain system 60 as previously described. In addition, as the water vapor condenses on the inner drum 20, the energy of condensation is transferred through the outer drum 18 to further encourage evaporation on the outer surfaces of the outer drum 18. The resulting distillate exits the vent and drain system 60 at a temperature that can be only a few degrees above the temperature of the liquid originally in the treating chamber 22, resulting in only a small amount of energy loss due to the vapor compression distillation method.

It is contemplated that the rate of treatment of the used water in the process tank 90 would exceed the rate at which condensation is formed from the clothing on the inside. In one non-limiting example, the maximum evaporation rate is 120 cc/min, or equal to a typical vented dryer, and the distillation process is 380 cc/min. As the laundry items become dry, the rate of evaporation would inevitably decrease to near zero and the rate of distillation on the exterior surfaces 118 of the outer drum 18 would approach 500 cc/min.

In one non-limiting example, the entire load of water that for evaporation and distillation is 25-31 liters, at the rates described herein, the drying/distilling cycle would take approximately 50-70 minutes. This is an improvement over typical combination washer/dryers. Additionally the combination washer/dryer 10 is ventless, and therefore does not pump prodigious air out of the house necessitating balance by an air conditioner or heater in the house. Furthermore, because of the distillation process, a net use of 1.5 liters of water is required for the washing process, vastly improving water usage when compared to a typical combination washer/dryer.

Additionally, a de-wrinkling process can occur at a conclusion of the drying and distillation cycle. The heater 46 in the door 40 can be turned on while the drum speed is slowed to allow tumbling. The laundry items can therefore be heated to a temperature that combined with the little remaining moisture, would de-wrinkle the clothing. When the distillation process is done, and de-wrinkling accomplished, the machine can be stopped, at which point the vacuum can be released via a valve.

Any dirty water left in the sump 94 or in the bottom of the process tank 90 can be pumped to a removable reservoir 380 (FIG. 9). A user can remove the reservoir and dump the dirty water prior to the next cycle. The user can rinse and fill the reservoir with 1.5 liters for the next cycle. The 1.5 liters can ensure replacement of any lost condensate or any remaining water in the laundry items.

Additionally, a filter can be provided at the compressor to capture whatever lint could otherwise be carried into the vacuum pump 82. While very little lint is expected to be suspended at such a low pressure, a filter can prevent any long term accumulation of lint on the walls in the interstitial space 38 between the outer and inner drums 18, 20.

It should be understood that all numerical values used are for illustrative purposes only and not meant to be limiting. The numerical values could vary based on tradeoff decisions during manufacture while the process described herein would remain the same.

Figure 7A:
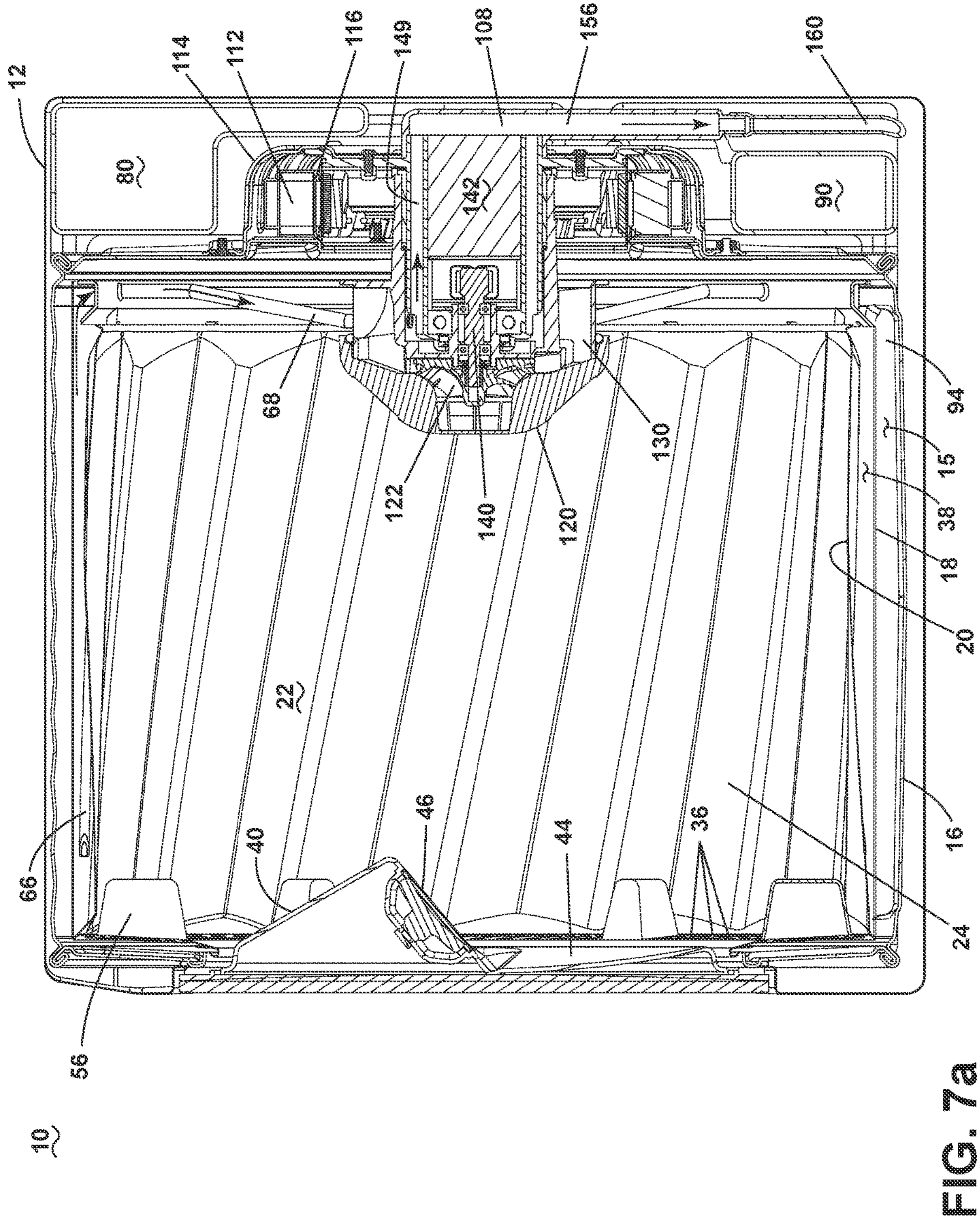

FIG. 7*a* more clearly illustrates the separate laundry treating chamber 22, interstitial space 38, and the external containment cavity 15 by removing some of the lines representing the 3-D nature of FIG. 7. It can more easily be seen that the laundry treating chamber 22 is defined by the inner drum 20. The interstitial space 38 is defined between the outer and inner drums 18, 20. Furthermore the external containment cavity 15 is separated from the interstitial space 38 by the outer drum 18.

Turning to FIG. 8, a schematic view of a dryer 210 according to another aspect of the disclosure herein is illustrated. Aspects of the dryer 210 are similar to the combination washer/dryer 10. Therefore, like parts will be identified with like numerals increased by 200, with it being understood that the description of the like parts of the combination washer/dryer 10 apply to the dryer 210 unless otherwise noted.

The dryer 210 includes an outer and inner drum 218, 220 defining an interstitial space 238. An infrared absorbing coating can line an outer surface 318 of the outer drum 218. An infrared heater 246 can be coupled to the outer surface 318 to radiate the outer surface 318 as it is rotated. The infrared heater 246 can be mounted to or connected with the outer surface 318 in any suitable manner. A laundry treating chamber 222 is defined by the inner drum 220 and sealed by a door 240. A release button 362*a* can be provided within the laundry treating chamber 222, by way of non-limiting example on the door 240. A relief valve 364 can also be provided at a rear portion of the dryer 210. A vacuum pump 282, motor 302, and compressor assembly 306 can be fluidly coupled to the interstitial space 238.

The compressor assembly 306 can be driven by the motor 302 and a separate motor not shown can drive the outer and inner drums 218, 220 by a belt as is used in a typical venter dryer. A flash evaporation starter 288 along with a vacuum pump 282 can also be provided in the dryer 210. Alternatively the heater 246 can add energy to the outer drum 218 to build up to the full rate over a period of time.

It is further contemplated that the heater 246 can be utilized to initiate the process in place of the flash evaporation starter 288 described herein. In one aspect, the heater 246 can be located where the flash evaporation starter 288 is illustrated, below the outer drum 218. It is also contemplated that the heater 246 be located in the sump 94 as described for the washer/dryer combo 10 and is the same heater as is used to heat the water during a washing cycle. The heater 246 can include a high emissivity coating and can be a standard calrod heater with a reflector under it. Due to an absence of any gasses, infrared radiation provides a primary means to heat the outer drum 218 while in a near vacuum state. The heater 246 can provide temperatures between 450 and 550 C and an IR radiation of between 2 micrometers and 10 micrometers. Other suitable temperatures and ranges for IR radiation are contemplated as well. The heater can be used to both start the process and warm the laundry items to the end of a cycle.

The relief valve 364 can open on a discharge side of the compressor assembly 306 coupling the interstitial space 238 to the atmosphere when the relief valve 364 is opened. At a predetermined lower pressure in the interstitial space 238, the atmospheric pressure outside the relief valve 364 would cause the relief valve 364 to close. By way of non-limiting example, this predetermined lower pressure could be 75% atmospheric pressure inside the tub walls, allowing the compressor assembly to pump at a very high rate initially, and reducing the amount that must be pumped down by the vacuum pump 282. The vacuum pump 282 is connected to the interstitial space 238 into which the compressor assembly 306 discharges. In an aspect of the disclosure herein, the laundry treating chamber 222 operates at or about 28 mBar while the interstitial space 238 is at 87 mBar (and substantially below atmosphere of 1000 mBar), a pressure ratio of 3.1:1. The vacuum pump 282, would only need to draw down to 87 mBar which, by way of non-limiting example, a small, low technology positive displacement pump could achieve.

The release button 362*a* can be in the form of a large obvious button placed inside the drum on the door, or in any other convenient location which would instinctively be pressed in an attempt to escape. Pressing of the release button 362*a* would cause a valve, by way of non-limiting example the relief valve 364, to open allowing atmosphere back into the laundry treating chamber 222 and preventing the vacuum pump 282 from continuing to evacuate the laundry treating chamber 222. It is further contemplated that the release button 362*a* would include an external button 362*b* that also capable of breaking the vacuum in the event a user external of the laundry treating chamber 222 realized a situation of entrapment has occurred. While illustrated on the dryer 210, it is also contemplated that a release button 362*a* can be incorporated in the combination washer/dryer 10 as described herein.

Turning to FIG. 9, a perspective rear view of the dryer 210 according to an aspect of the disclosure herein is illustrated. It is contemplated that the condensate tank 390 is located on top of the dryer 210 for easier access for a user. A vent and drain system 260 can be integral with the dryer 210 and fluidly coupled to a cooling assembly 360 including an air conduit 374. It is further contemplated that the vent and drain system 260 features ribbed walls 370 that can form collection channels 272, illustrated in dashed line and more clearly described previously as collection channels 72, in the interstitial space 238 between the outer and inner drums 218, 220. The collection channels 272 can be fluidly coupled to the compressor assembly 306 by a plurality of collection conduits 266.

Similar to the combination washer/dryer 10 described herein, the dryer 210 can utilize vapor compression distillation and flash evaporation for drying laundry items. In flash evaporation, the extremely high rate of evaporation that can occur when water suddenly is above the boiling point defined by the pressure and temperature of the water, by way of non-limiting example, when laundry items and water are heated to 43° C., which is 20° C. above a 23° C. boiling point at 28 mBar, a large potential of evaporation can be produced using a low power heater. Reduction of pressure, by way of non-limiting example utilizing the vacuum pump 82, will enable the evaporation at a high rate until the heat content of the 20° C. difference in the wet clothing is consumed. This allows a brief surge period of evaporation during which condensation can be established at a high rate. The process can then be sustained at that high rate using a low power rate of 400-500 watts.

In another aspect of the disclosure herein, a fan 372 can be provided at a bottom portion of the air conduit 374 and exhaust under the outer and inner drums 218, 220. The air conduit 374 includes an inlet 376 around the condensate tank 390, in the top corner of the cabinet 212, thus heating the air (A1) and claiming some heat in non-condensable gases and uncondensed water vapor and the condensate itself that may be lost otherwise to the process. This air (A1) can be cooling air (A2) for the compressor assembly 306 due to the relatively lower temperature with respect to the compressor assembly 306 during operation. Rejected heat from the compressor assembly 306 can be captured forming hot air (A3) which is then blown over the vacuum pump 282 and under the outer and inner drums 218, 220 where it will rise over the tub and transfer some of the heat into the tub. The air blown over the pump down low can induce air around it thus taking cool air from down low to aid in cooling the pump motor. A convection is set up around the tub where the cooled air drops down to the bottom to be reheated. The cabinet 212 can be insulated to prevent heat loss. In other words, the cooling assembly 360 draws air through a heat exchanger into the condensate tank 390 to cool residual water vapor from the vacuum pump 282 venting into the condensate tank. This cooling air then proceeds via a conduit 374 to cool the compressor assembly 360, motor 302, and vacuum pump 282. The cooling assembly 360 can be fluidly coupled to a condensate tank 390.

It is further contemplated that any steam or water vapor created when laundry items contact the inner drum 218 will transfer that heat further into the treating chamber 222. If this heat re-condenses, this energy is not lost, but will eventually cause evaporation towards the center of the laundry treating chamber 222, as previously described in detail with respect to the combination washer/dryer 10. It is therefore contemplated that zero or very little rotation may be needed to complete drying. This is possible because the heat of condensation is conducted through a wall and into contact directly with the clothing.

A removable reservoir 380 can be provided at any portion of the dryer 210 either on a front bulkhead near the door, or in a back bulkhead, for collecting water during a drying cycle with a provision for the customer to remove it and dump it at the conclusion of the cycle, or to have a drain into a small sump pump after the vacuum is released with a pressure actuated valve. The water can be removed by the customer down low, or pumped with a small pump up to a reservoir up high.

The low pressure drying process can be controlled such that some wetness remains in the laundry items at the end of a cycle, as opposed to being bone dry. Since the specific heat of clothing without water is significantly less when dry, a warming can occur without the expenditure of significant amounts of energy when clothing is mostly dry. Additionally, the vacuum can be released during this warming allowing air to convect some heat in addition to direct contact with the drum. If needed, the drum can rotate more quickly for a more vigorous tumble in a de-wrinkling cycle as previously described herein, for a short time, thus still limiting clothing damage.

Pressure within the laundry treating chamber 222 and the interstitial spaces 238 can be monitored using temperature sensors and/or conduction sensors. By way of non-limiting example, after the drying process is started, the evaporation rate can decrease due to less water available to evaporate, the pressure can therefore be lowered inside the laundry treating chamber 222 and/or raised inside interstitial space 238, because there is less water vapor flow. In the event that the compressor assembly continues operating at the same rate, the pressure inside the laundry treating chamber 222 will lower, since it is now ahead of the evaporation rate. This pressure drop can signal a controller that evaporation has slowed. The machine can then respond by reducing the speed of the compressor assembly until the pressure is returned and maintained at a desired set point. As the cycle progresses, the speed of the compressor assembly can be lowered to a point that further speed changes affect very little in terms of the sensors. Little change in the sensors can be a signal that very little evaporation is occurring and the laundry items are dry. On the other hand, if the pressure rises inside the tub, this is indication that the compressor is not keeping up with evaporation. Thus an impeller speed increase is in order. A supplemental temperature measure could be done to back up the primary decision using pressure.

The aspects of the disclosure described herein disclose a laundry treating appliance, for example, a dryer or a combination washer/dryer, as well as a laundry treating method for said laundry treating appliance, wherein vapor compression distillation can be leveraged to aid in and accomplish drying of the laundry items to be treated. This results in improved efficiency of the laundry treating appliance, less water consumption needed for a cycle of operation, and a shorter cycle time than typical, in particular in the context of the combination washer/dryer. In addition, as compared to a typical vapor compression distillation assembly, the assemblies and methods of the present disclosure allow for the elimination of the considerations associated with the high temperatures of traditional vapor compression distillation assemblies, such as allowing for the use of less expensive materials that do not need to be able to withstand higher temperatures, and eliminating the need for insulative materials to be included to prevent heat loss from the vapor compression distillation assembly. By operating the laundry treating appliance below atmospheric pressure and at or near ambient temperatures, the expense of additional heaters or heating elements can be eliminated or reduced. The compressor or vacuum pump, such as a positive displacement compressor, can be small and low cost and can reduce pressure sufficiently in a short period of time to reduce pre-heating and start up time.

The dryer or combination washer/dryer disclosed herein can be provided with a vapor compression distillation assembly similar to or the same as the vapor compression distillation assembly in U.S. Provisional Patent Application No. 62/646,551, filed Mar. 22, 2018, entitled "VAPOR COMPRESSION DISTILLATION ASSEMBLY," which is herein incorporated by reference in full.

To the extent not already described, the different features and structures of the various embodiments of the present disclosure may be used in combination with each other as desired. That one feature may not be illustrated in all of the embodiments is not meant to be construed that it cannot be, but is done for brevity of description. Thus, the various features of the different embodiments may be mixed and matched as desired to form new embodiments, whether or not the new embodiments are expressly described.

While aspects of the present disclosure have been specifically described in connection with certain specific embodiments thereof, it is to be understood that this is by way of illustration and not of limitation. Reasonable variation and modification are possible within the scope of the forgoing disclosure and drawings without departing from the spirit of the present disclosure which is defined in the appended claims.

What is claimed is:

1. A motor assembly for a laundry treating appliance, the motor assembly comprising:

an impeller housing;

a compressor housing defining at least one cooling cavity and disposed within the impeller housing;

a compressor motor disposed within the compressor housing and fluidly coupled to the at least one cooling cavity;

a rear manifold fluidly coupled to the compressor housing to further define the at least one cooling cavity;

a dividing arm extending from the rear manifold and dividing the at least one cooling cavity into two cooling cavities;

an impeller mechanically coupled to the compressor motor and disposed within the impeller housing;

and a cover for the impeller housing, the cover defining a compressor inlet.

2. The motor assembly of claim 1, further comprising a rotor and a stator circumscribing the rotor.

3. The motor assembly of claim 2, further comprising a stator mounting plate comprising an annular housing for housing the rotor and the stator.

4. The motor assembly of claim 3, wherein the compressor housing comprises a circular base mounted to the annular housing.

5. The motor assembly of claim 4, wherein the compressor housing comprises a cylindrical housing extending from the circular base for housing the compressor motor.

6. The motor assembly of claim 5, further comprising a separating wall located within the stator mounting plate and extending between the rotor and the stator.

7. The motor assembly of claim 1, wherein the rear manifold further comprises an exit conduit.

8. The motor assembly of claim 7, wherein the compressor housing further comprises a connection conduit fluidly coupled to the exit conduit.

9. The motor assembly of claim 8, wherein the exit conduit fluidly couples a vent and drain system of the laundry treating appliance to a reuse tank of the laundry treating appliance.

10. The motor assembly of claim 1, wherein the impeller housing comprises a first cylindrical portion for housing the impeller.

11. The motor assembly of claim 10, further comprising a second cylindrical portion for receiving the compressor housing.

12. The motor assembly of claim 11, wherein the second cylindrical portion is circumferentially smaller than the first cylindrical portion.

13. The motor assembly of claim 12, wherein the compressor housing comprises a cylindrical housing received within the second cylindrical portion.

14. A laundry treating appliance comprising:

an outer drum;

an inner drum located within the outer drum and spaced from the outer drum to define an interstitial space;

a vent and drain system comprising at least one collection channel located within the interstitial space and a drain channel fluidly coupled to the at least one collection channel; and a motor assembly comprising a compressor assembly fluidly coupled to the vent and drain system, the compressor assembly comprising an impeller housing, a compressor housing disposed within the impeller housing, a compressor motor disposed within the compressor housing, an impeller mechanically coupled to the compressor motor and disposed within the impeller housing, and a cover for the impeller housing;

wherein the compressor housing defines at least one cooling cavity fluidly coupled to the compressor motor.

15. The laundry treating appliance of claim 14, further comprising a rear manifold fluidly coupled to the compressor housing to further define the at least one cooling cavity.

16. The laundry treating appliance of claim 15, further comprising a dividing arm extending from the rear manifold and dividing the at least one cooling cavity into two cooling cavities.

17. The laundry treating appliance of claim 16, wherein the rear manifold further comprises an exit conduit and the compressor housing further comprises a connection conduit fluidly coupled to the exit conduit.

18. The laundry treating appliance of claim 17, further comprising a reuse tank and the exit conduit fluidly couples the vent and drain system to the reuse tank.

* * * * *